(12) United States Patent
Innes

(10) Patent No.: US 12,439,893 B2
(45) Date of Patent: Oct. 14, 2025

(54) BARRIER AND A METHOD OF OPERATING THE SAME

(71) Applicant: Skyfield Acres Inc., Woodstock (CA)

(72) Inventor: Alexander Innes, Woodstock (CA)

(73) Assignee: Skyfield Acres Inc., Woodstock (CA)

( * ) Notice: Subject to any disclaimer, the term of this patent is extended or adjusted under 35 U.S.C. 154(b) by 34 days.

(21) Appl. No.: 18/344,213

(22) Filed: Jun. 29, 2023

(65) Prior Publication Data

US 2025/0000063 A1   Jan. 2, 2025

(51) Int. Cl.
*A01K 31/22* (2006.01)
*A01K 1/00* (2006.01)
*A01K 13/00* (2006.01)

(52) U.S. Cl.
CPC ............ *A01K 31/22* (2013.01); *A01K 1/0005* (2013.01); *A01K 13/003* (2013.01)

(58) Field of Classification Search
USPC ....... 119/219, 220, 401, 407, 412, 414, 415, 119/413, 423, 436, 437, 490, 487, 488, 119/492, 495, 511, 523, 840, 843, 510
See application file for complete search history.

(56) References Cited

U.S. PATENT DOCUMENTS

| | | | | |
|---|---|---|---|---|
| 1,094,960 A | * | 4/1914 | Andersson | A01K 5/01 119/58 |
| 1,299,074 A | * | 4/1919 | Warman | E05F 15/42 49/265 |
| 2,320,604 A | * | 6/1943 | Jackson | E06B 3/01 49/102 |
| 3,032,010 A | * | 5/1962 | Kaegebein | A01K 31/16 119/437 |
| 3,429,298 A | * | 2/1969 | James | A01K 1/007 160/331 |
| 3,450,100 A | * | 6/1969 | Cuculic | A01K 45/005 119/441 |
| 3,942,476 A | * | 3/1976 | Napier | A01K 45/005 119/845 |
| 4,315,481 A | * | 2/1982 | Coile | A01K 31/16 119/437 |
| 4,524,722 A | * | 6/1985 | Siccardi | A01K 31/22 119/448 |
| 5,031,574 A | * | 7/1991 | McDowell | A01K 1/007 160/331 |
| 5,076,212 A | * | 12/1991 | Thompson | A01K 15/003 119/51.01 |

(Continued)

FOREIGN PATENT DOCUMENTS

| | | | | |
|---|---|---|---|---|
| DE | 202006011121 | * | 9/2006 | ............ A01K 31/18 |
| EP | 0609057 A2 | * | 8/1994 | ............ A01K 31/04 |
| WO | WO-2022034590 A1 | * | 2/2022 | ............ A01K 1/0005 |

*Primary Examiner* — Andrea M Valenti
(74) *Attorney, Agent, or Firm* — Rowand LLP

(57) ABSTRACT

A barrier comprises at least one grating comprising a plurality of elongated openings; a winch positioned above the at least the one grating and rotatable between first and second positions; and at least one cable connected at a first end to the winch and at a second end to the at least one grating, the at least one cable holding the at least one grating in an upright position on a support surface when the winch is in the first position and lifting the at least one grating from the support surface towards the winch during rotation of the winch from the first position to the second position.

10 Claims, 7 Drawing Sheets

(56) References Cited

U.S. PATENT DOCUMENTS

| | | | | |
|---|---|---|---|---|
| 5,189,983 A | * | 3/1993 | Aitchison | A01K 1/0011 |
| | | | | 119/302 |
| 5,254,040 A | * | 10/1993 | Eller | A63C 19/02 |
| | | | | 49/197 |
| 6,612,359 B1 | * | 9/2003 | Moreau | F24F 13/12 |
| | | | | 160/243 |
| 6,722,972 B1 | * | 4/2004 | Holtkamp | F24F 11/0001 |
| | | | | 454/239 |
| 9,788,531 B2 | * | 10/2017 | Kokenge | A01K 39/01 |
| 10,499,613 B1 | * | 12/2019 | Whelan | A01K 1/0023 |
| D957,685 S | | 7/2022 | Katz | |
| 2008/0190373 A1 | * | 8/2008 | Lee | A61K 9/0095 |
| | | | | 119/72 |

* cited by examiner

BARRIER AND A METHOD OF OPERATING THE SAME

TECHNICAL FIELD

The present application relates to a barrier and a method of operating the same.

BACKGROUND

The poultry industry is adapting to the threat of antibiotic resistance. This is in part due to the introduction of a class of poultry producers known as raised without antibiotics (RWA) producers. The main characteristic of this type of flock is that antibiotics are not administered to the birds at any point throughout the growth cycle.

In lieu of antibiotics, spray vaccines may be used. The use of spray vaccines takes advantage of young birds grooming one another in close proximity. The key to the effectiveness of spray vaccines is to ensure the young birds are kept close to one another. This may be achieved using a method referred to as brooding.

In conventional brooding, barriers such as cardboard barriers are used. These cardboard barriers are typically anchored against existing water and/or feed lines and require a laborious set up process. Storing these cardboard barriers attracts insects as well as rodents.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
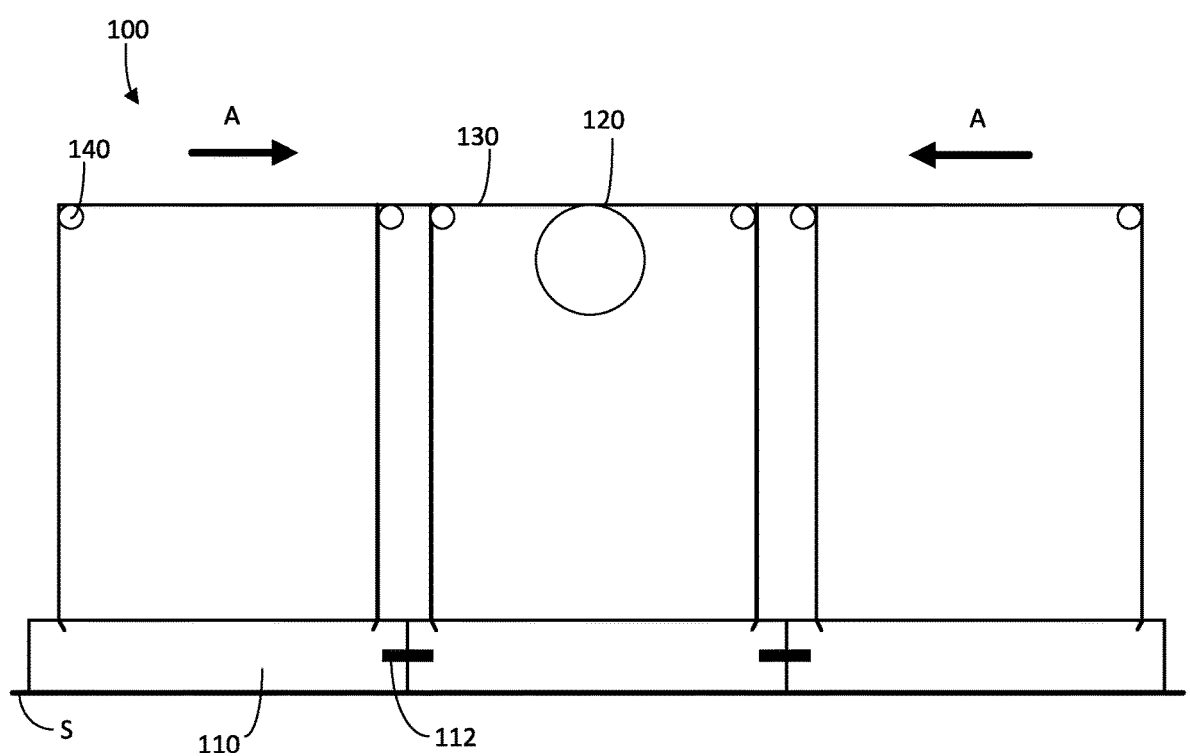
FIG. 1 is a front view of a barrier having a winch in a first position according to an example embodiment.

Accordingly, in one aspect there is provided a barrier comprising at least one grating comprising a plurality of elongated openings; a winch positioned above the at least the one grating and rotatable between first and second positions; and at least one cable connected at a first end to the winch and at a second end to the at least one grating, the at least one cable holding the at least one grating in an upright position on a support surface when the winch is in the first position and lifting the at least one grating from the support surface towards the winch during rotation of the winch from the first position to the second position.

In one or more embodiments, the plurality of elongated openings are dimensioned to block passage of chicks.

In one or more embodiments, the at least one grating includes a plurality of gratings connected to one another in a linear manner.

In one or more embodiments, the plurality of gratings extend an entire length of a barn.

In one or more embodiments, the second end of the at least one cable includes a hook that extends through one or more of the openings in the at least one grating to connect the at least one cable to the at least one grating.

In one or more embodiments, the at least one grating includes a generally flat bottom surface that sits flush on the support surface when the winch is in the first position.

In one or more embodiments, dimensions of the at least one grating include a length of 10 feet and a height of 1 foot.

In one or more embodiments, the at least one cable remains connected to the at least one grating when the winch is in the second position.

In one or more embodiments, when the winch is in the first position, the at least one grating is held in the upright position on the support surface to limit an amount of space for chicks in a barn.

In one or more embodiments, when the winch is in the second position, the at least one grating is held above the support surface to increase an amount of space for chicks in a barn.

In one or more embodiments, the winch is in the first position for a predefined time period after chicks have been unloaded into a barn and is rotated to the second position upon expiry of the predefined time period.

According to another aspect there is provided a method for operating a barrier, the method comprising rotating a winch from a second position to a first position to lower at least one grating to an upright position on a support surface of a barn such that the at least one grating limits an amount of space for a flock of chicks; unloading the flock of chicks into the barn such that the at least one grating serves as a barrier for the flock of chicks; and upon expiry of a predefined time period, rotating the winch from the first position to the second position to raise the at least one grating from the support surface to increase the amount of space for the flock of chicks.

In one or more embodiments, the at least one grating is connected to the winch by way of at least one cable.

In one or more embodiments, the flock of chicks is sprayed with a vaccine prior to being unloaded into the barn.

In one or more embodiments, the method further comprises connecting a plurality of barriers in a linear manner to extend a length of the barn.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Turning to FIG. 1, a barrier is shown and is generally identified by reference numeral 100. The barrier 100 includes at least one grating 110, a winch 120 and at least one cable 130. The barrier 100 may be used for area restriction with a barn during, for example, brooding, half house brooding, etc.

In the embodiment shown in FIG. 1, the at least one grating 110 includes three (3) gratings 110. In one or more embodiments, the number of gratings 110 may be dependent on a size of the barn the barrier 100 is installed in. For example, the at least one grating 110 may include ten (10) gratings 110. In one or more embodiments the number of gratings 110 may be selected to ensure that the barrier 100 extends an entire length of the barn.

In embodiments where the at least one grating 110 includes a plurality of gratings 110, the gratings are connected to one another in a linear manner using connectors 112. In one or more embodiments, the connector 112 may include a zip-tie and may be installed such that adjacent gratings 110 are connected to one another. Other examples of connectors that may be used include hose clamps or fasteners.

Figure 2:
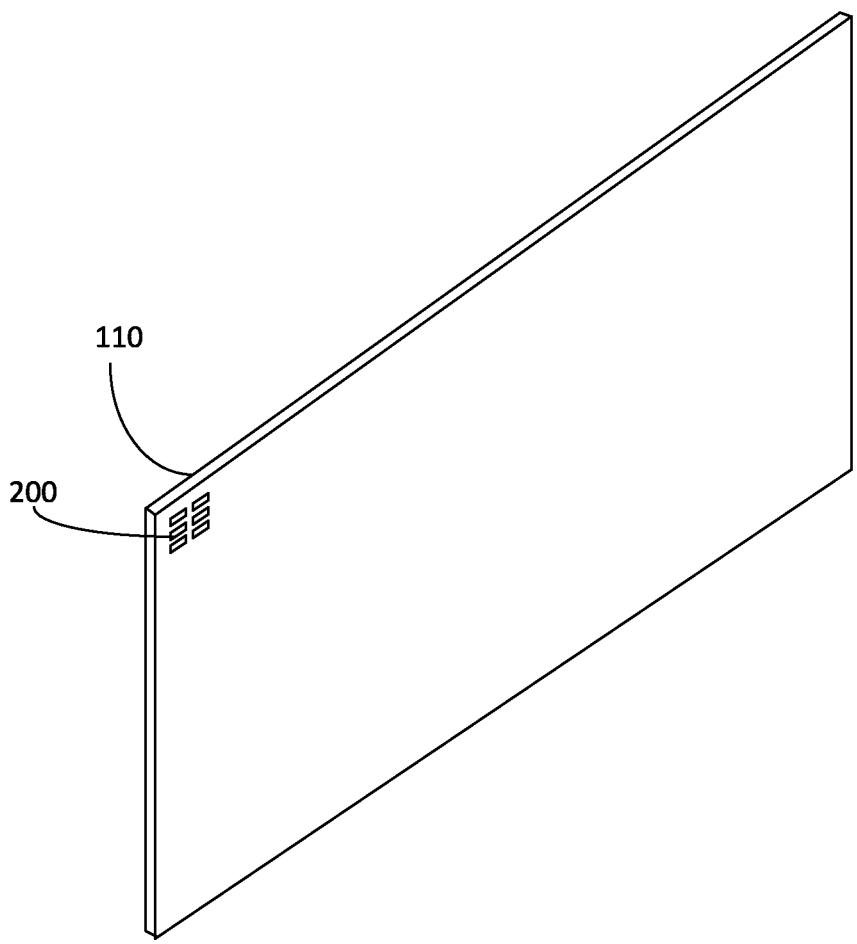
FIG. 2 is an isometric view of a grating forming part of the barrier of FIG. 1 according to an example embodiment.

An isometric view of an example grating 110 is shown in FIG. 2. As can be seen, the grating 110 is generally rectangular and includes a plurality of elongated openings 200. The openings 200 are arranged in columns and rows and extend through the grating 110. In FIG. 2, a small number of openings 200 are shown and this is for illustrative purposes only. It will be appreciated that the entire grating 110 has openings. Specifically, the grating 110 includes a plurality of rows of openings 200 and a plurality of columns of openings 200 that extend through the entire planar surface of the grating 110.

In one or more embodiments, the openings 200 are dimensioned to block the passage of day-old chicks. The openings 200 permit the passage of air and allow for proper airflow within the barn. The grating 110 may be made of a lightweight rigid material such as for example a fiberglass-reinforced polymer material. The material may additionally be corrosion-resistant and/or fire-retardant.

A bottom surface of the grating 110 is generally flat and, as will be described in more detail below, the bottom surface of the grating 110 sits flush on a support surface S when the winch 120 is in a first position.

In one or more embodiments, dimensions of the grating 110 may include a length of ten (10) feet and a height of one (1) foot. Other dimensions may be used and this may be dependent on the dimensions of the barn. For example, it may be that a barn has a length of ninety-five (95) feet and as such, to ensure the barrier 100 extends the total length of the barn, the barrier 100 may include nine (9) gratings having lengths of ten (10) feet and one (1) grating having a length of five (5) feet. As another example, the grating 110 may have a height of 9 inches, 10.5 inches, etc.

Referring back to FIG. 1, the winch 120 is positioned above the at least one grating 110. In one or more embodiments, the winch 120 may be connected to a ceiling of the barn at a position above the at least one grating 110.

The winch 120 is rotatable between first and second positions. In one or more embodiments, the winch 120 may rotate in a clockwise direction from the first position to the second position. The winch 120 may rotate in a counter-clockwise direction from the second position to the first position. It will be appreciated that rotation of the winch 120 may stop at a point between the first position and the second position.

In one or more embodiments, the winch 120 may be rotated through use of a drill such as for example a power drill. In these embodiments, the drill may have a connector that is configured to mate with a connector on the winch 120. In one or more embodiments, the connector may extend down from the winch 120 such that it is within reach of a user. The drill may then be operated to rotate in a clockwise or counterclockwise direction and in response the winch 120 may rotate between the first and second positions. It will be appreciated that other devices may be used to rotate the winch 120. For example, the winch 120 may be connected to a motor that may be electrically or solar powered and may be operated to cause the winch 120 to rotate. As another example, the winch 120 may include a hand crank that may be used to rotate the winch 120.

The at least one cable 130 may include a plurality of cables connected as a cable system. The at least one cable 130 is connected at a first end to the winch 120 and at a second end to the at least one grating 110. A portion of the cable 130 may be wrapped around a spool of the winch 120. Rotation of the winch 120 may cause the cable 130 to unwrap or unwind from the spool of the winch 120 and this may be done to selectively raise and lower the at least one grating 110, as will be described. In one or more embodiments, pulleys 140 may be used to guide the at least one cable 130 as it is selectively wrapped or unwrapped from the spool of the winch 120. The arrows A show the direction of travel of the at least one cable as it is wrapped around the spool of the winch 120.

The at least one cable 130 may include a metal cable or a metal chain or may be made of another material that may be windable about the spool of the winch 120.

Figure 3:
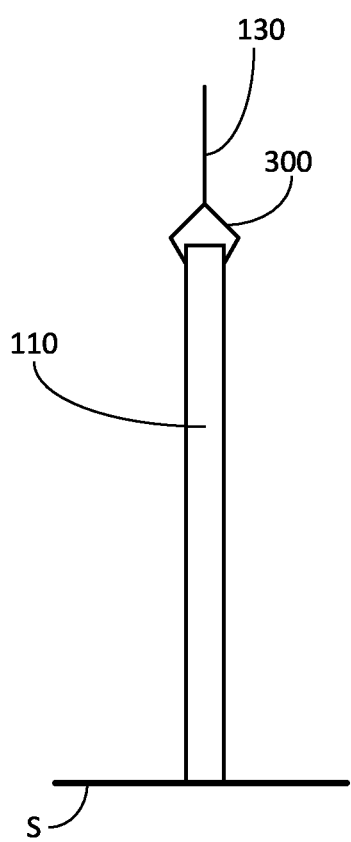
FIG. 3 is a side view showing a portion of the barrier of FIG. 1 according to an example embodiment.

In one or more embodiments, the second end of the at least one cable 130 may be connected to or may be configured as a hook or other type of connector that may be used to connect the at least one cable 130 to the at least one grating 110. An example is shown in FIG. 3. As can be seen, a hook 300 is connected to the second end of the at least one cable 130. The hook 300 includes a claw-like structure that is configured to extend through one or more openings in the at least one grating 110 and in this manner the hook 300 is used to connect and secure the at least one cable 130 to the at least one grating 110. It will be appreciated that although only a single hook 300 is shown in FIG. 3, multiple hooks 300 may be used to connect the at least one cable 130 to the at least one grating 110. For example, each grating 110 may be connected to two cables 130 by way of two hooks 300. As another example, the second end of the at least one cable 130 may be directly hooked onto the at least one grating 110.

As mentioned, the winch 120 is rotatable between first and second positions. FIGS. 1 to 4 illustrate the barrier 100 when the winch 120 in the first position. As best shown in FIGS. 1 and 3, in the first position, the at least one cable 130 holds the at least one grating 110 in an upright position on a support surface S. The support surface S may be, for example, a floor of the barn.

Figure 4:
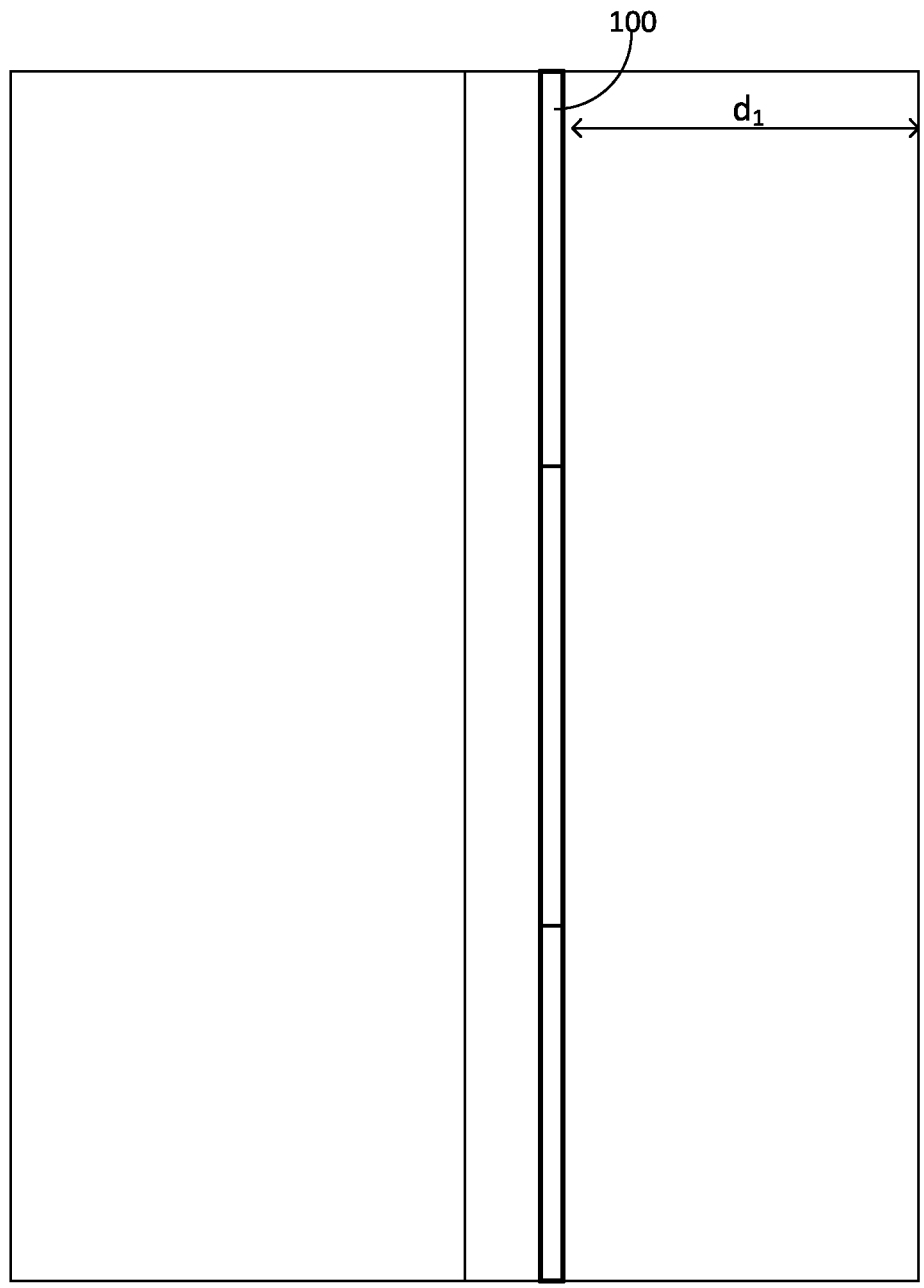
FIG. 4 is a plan view showing the barrier of FIG. 1 installed in a barn according to an example embodiment.

As shown in FIG. 4, when the winch 120 is in the first position, the at least one grating 110 is held in the upright position on the support surface S. The barrier 100 limits the amount of space for chicks in the barn by reducing the width of the area for the chicks to a distance $d_1$.

Figure 5:
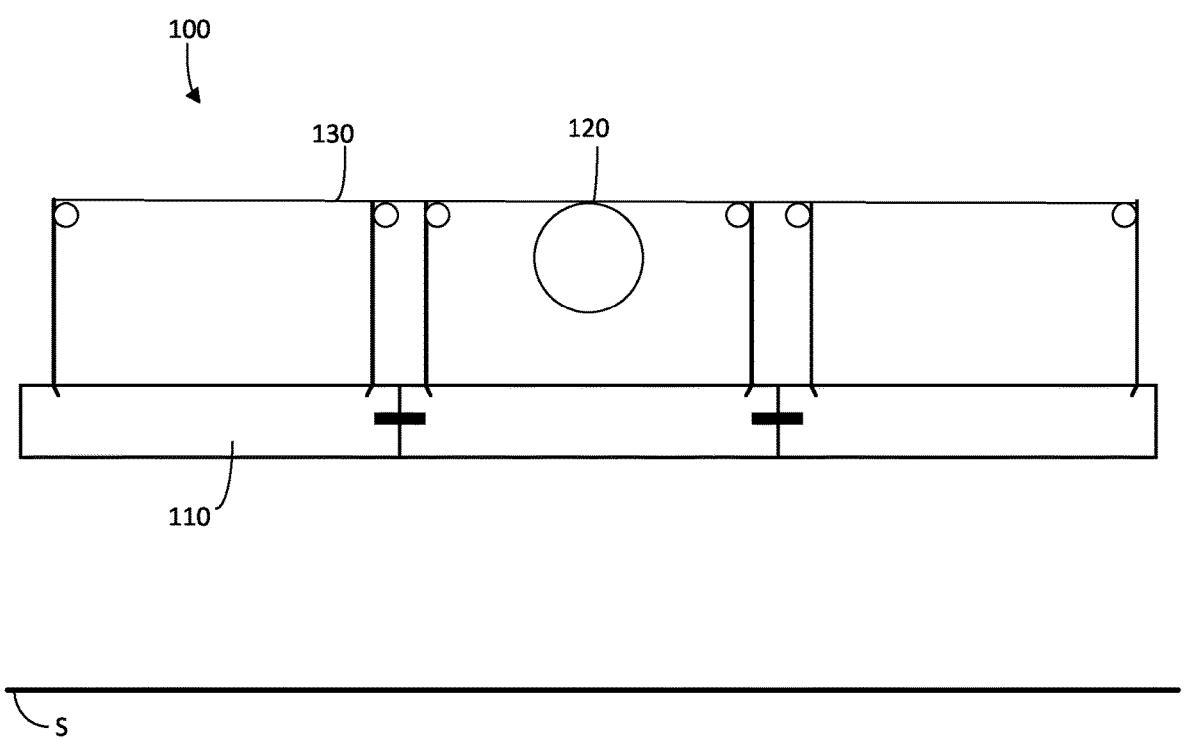
FIG. 5 is a front view of the barrier of FIG. 1 having the winch in a second position according to an example embodiment.
Figure 6:
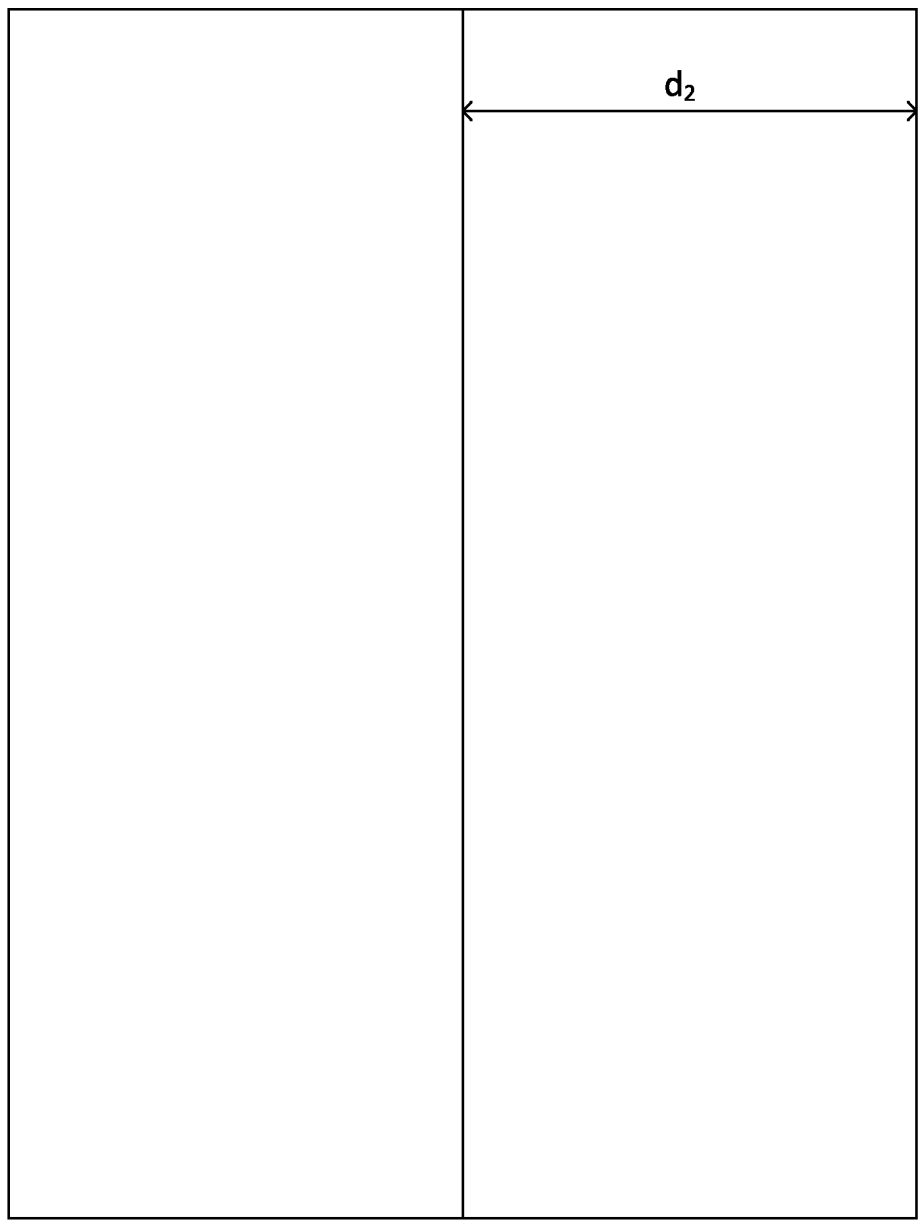
FIG. 6 is a plan view showing a barn according to an example embodiment.

FIGS. 5 and 6 illustrate the barrier 100 when the winch 120 is in the second position. As best shown in FIG. 5, in the second position, the at least one cable 130 holds the at least one grating 110 above the support surface S. As shown in FIG. 6, when held above the support surface S, the barrier increases the amount of space for the chicks in the barn by increasing the width of area for the chicks to a distance $d_2$.

It will be appreciated that in embodiments described herein, the at least one cable 130 may remain connected to the at least one barrier 110 when the winch is in the first position and when the winch is in the second position.

The barrier described herein is not limited in position to the location of the water and/or feedlines of the barn. Put another way, the barrier is an independent system that allows one or more gratings to be held in an upright position on the support surface without relying on the water and/or feedlines of the barn. In this manner, the barrier may be installed within the barn as desired to selectively limit the amount of space for a flock of chicks in the barn. This is different than conventional systems which must be installed such that they are anchored to existing water and/or feedlines.

Figure 7:
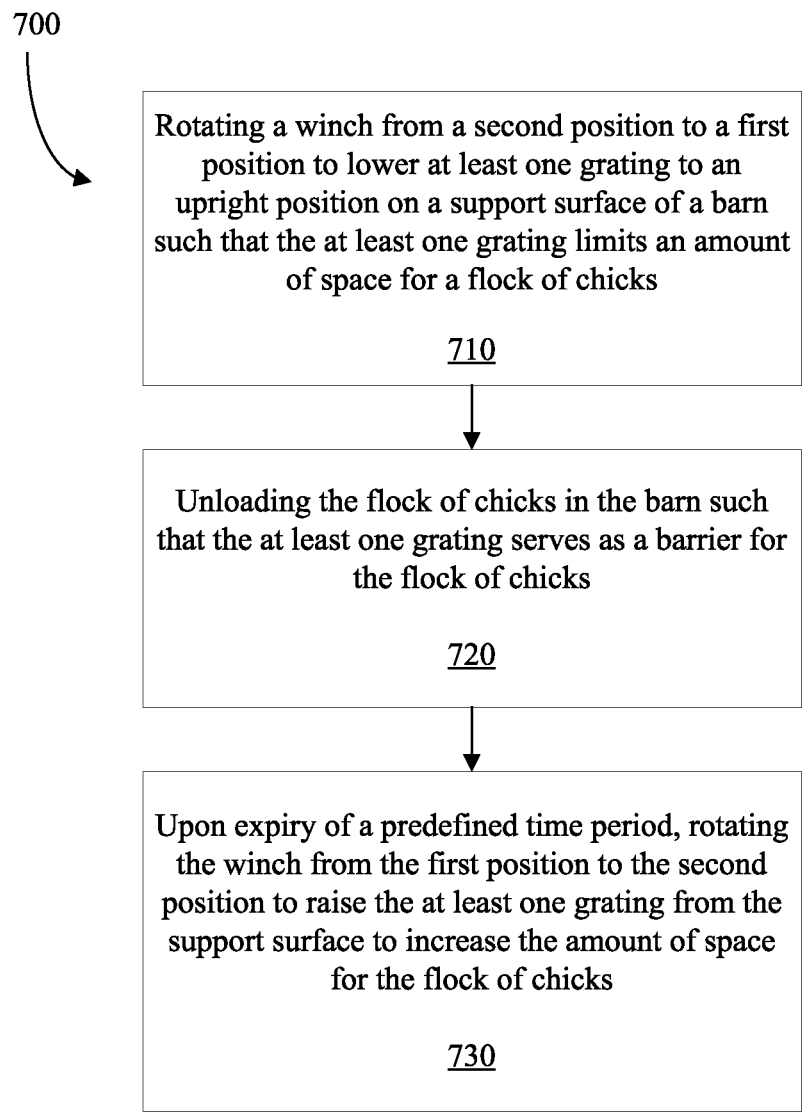
FIG. 7 is a flowchart showing a method of operating the barrier of FIG. 1.

FIG. 7 is a flowchart showing a method 700 of operating the barrier 100.

The method 700 includes rotating a winch from a second position to a first position to lower at least one grating to an upright position on a support surface of a barn such that the at least one grating limits an amount of space for the flock of chicks (step 710).

As mentioned, in one or more embodiments, the winch 120 may be rotated through use of a drill such as for example a power drill. In these embodiments, the drill may have a connector that is configured to mate with a connector on the winch 120. The drill may then be operated to rotate in a clockwise or counterclockwise direction and in response the winch 120 may rotate between the first and second positions. As another example, the winch 120 may be rotated using a hand crank or may be connected to an electrical or solar powered system.

As the winch is rotated from the second position to the first position, the at least one cable 130 unwinds from the winch 120 and as a result the at least one grating is lowered towards the support surface S. The winch 120 continues rotation until it reaches the first position where the at least one grating 110 is held in an upright position on the support surface S. As a result, the barrier limits the amount of space for the flock of chicks in the barn.

The method 700 includes unloading the flock of chicks into the barn such that the at least one grating serves as a barrier for the flock of chicks (step 720).

In one or more embodiments, the flock of chicks may be sprayed with a vaccine prior to being unloaded into the barn.

Once the barrier has been positioned, the flock of chicks may be loaded into the barn such that the at least one grating serves as a barrier for the flock of chicks. In embodiments where the flock of chicks have been sprayed with the vaccine, by reducing or limiting the amount of space for the unloaded flock of chicks, the flock of chicks are kept close to one another thereby increasing the effectiveness of the spray vaccine.

The method 700 includes, upon expiry of a predefined time period, rotating the winch from the first position to the second position to raise the at least one grating from the support surface to increase the amount of space for the flock of chicks (step 730).

The predefined time period may be determined based on the type of vaccine sprayed on the flock of chicks and/or based on the age of the chicks. The predefined time period may be, for example, ten (10) days.

Upon expiry of the predefined time period, the winch is rotated from the first position to the second position and this may be done using a drill, for example, as described herein.

As the winch is rotated from the first position to the second position, the at least one cable 130 winds around the spool of the winch 120 and as a result the at least one grating is raised from the support surface S. The winch 120 continues rotation until it reaches the second position where the at least one grating 110 is held above the support surface S. As a result, the amount of space for the flock of chicks is increased.

In one or more embodiments, prior to operating the barrier, the method may include connecting a plurality of barrier in a linear manner to extend a length of the barn.

It will be appreciated that the barrier and the method of operating the barrier described herein may additionally or alternatively be used during a catching process for corralling birds.

As noted, certain adaptations and modifications of the described embodiments can be made. Therefore, the above discussed embodiments are considered to be illustrative and not restrictive.

What is claimed is:

1. A method of isolating a flock of chicks in a barn, the method comprising:
   providing a barrier comprising:
   a plurality of gratings connected to one another in a linear manner to define a bottom linear planar surface continuously extending an entire length of the barn, each grating comprising a plurality of elongated openings dimensioned to block passage of chicks from the flock of chicks;
   a winch positioned above the plurality of gratings and rotatable between first and second positions; and
   at least one cable connected at a first end to the winch and at a second end to at least one of the plurality of gratings, the at least one cable holding the plurality of gratings in an upright position such that the bottom linear planar surface sits flush on a support surface of the barn when the winch is in the first position and lifting the plurality of gratings from the support surface towards the winch during rotation of the winch from the first position to the second position, the at least one cable remaining connected to the at least one of the plurality of gratings when the winch is in the first position and when the winch is in the second position and wherein the plurality of gratings are held in the upright position by the at least one cable without contacting existing water or feedlines within the barn;
   rotating the winch from the second position to the first position to lower the at least one grating to the upright position on the support surface of the barn such that the at least one grating limits the amount of space for the flock of chicks;
   unloading the flock of chicks into the barn such that the at least one grating serves as a barrier to limit the amount of space for the flock of chicks for a predefined time period that is dependent on a type of vaccine sprayed on the flock of chicks; and
   upon expiry of the predefined time period, rotating the winch from the first position to the second position to raise the at least one grating from the support surface to increase the amount of space for the flock of chicks.

2. The method of claim 1, wherein the flock of chicks is sprayed with the type of vaccine prior to being unloaded into the barn.

3. The method of claim 1, further comprising:
   connecting a plurality of barriers in a linear manner to extend the entire length of the barn.

4. The method of claim 1, wherein the winch is rotated using one of a power drill, a hand crank, or an electrical system comprising a motor connected to the winch.

5. The method of claim 1, wherein the predefined time period includes ten days.

6. The method of claim 1, wherein rotating the winch from the first position to the second position winds the at least one cable around a spool of the winch.

7. The method of claim 1, wherein rotating the winch from the second position to the first position unwinds the at least one cable from the winch.

8. The method of claim 1, wherein the winch is rotated in a clockwise direction from the first position to the second position.

9. The method of claim 1, wherein the winch is rotated in a counterclockwise direction from the second position to the first position.

10. The method of claim 1, wherein the second end of the at least one cable includes a hook to connect to the at least one of the plurality of gratings.

\* \* \* \* \*